(12) United States Patent
Karppanen

(10) Patent No.: US 11,474,801 B1
(45) Date of Patent: Oct. 18, 2022

(54) AUTOMATIC APPLICATION INSTALLATION BASED ON PROXIMITY DETECTION

(71) Applicant: Amazon Technologies, Inc., Seattle, WA (US)

(72) Inventor: Jari Karppanen, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/143,155

(22) Filed: Sep. 26, 2018

(51) Int. Cl.
 G06F 9/445 (2018.01)
 G06F 8/61 (2018.01)
 H04L 67/00 (2022.01)
 H04L 67/52 (2022.01)

(52) U.S. Cl.
 CPC .................. G06F 8/61 (2013.01); G06F 8/62 (2013.01); H04L 67/34 (2013.01); H04L 67/52 (2022.05)

(58) Field of Classification Search
 CPC ........................................................ G06F 8/61
 USPC ....................................................... 717/175
 See application file for complete search history.

(56) References Cited

U.S. PATENT DOCUMENTS

| | | | |
|---|---|---|---|
| 7,542,849 B2 * | 6/2009 | Twitchell, Jr. ....... | G01C 21/025 701/500 |
| 9,069,584 B2 * | 6/2015 | Shelansky ........... | G06F 9/44526 |
| 9,411,572 B2 * | 8/2016 | Luk ........................... | G06F 8/62 |
| 9,515,836 B2 * | 12/2016 | Tredoux ................ | H04W 12/10 |
| 9,853,929 B2 * | 12/2017 | Pollack ..................... | G06F 8/71 |
| 10,216,506 B2 * | 2/2019 | Armand ................ | H04W 8/245 |
| 10,367,905 B2 * | 7/2019 | Kouru .................. | H04L 67/2842 |
| 2006/0161915 A1 * | 7/2006 | Barr .......................... | G06F 8/61 717/174 |
| 2006/0212519 A1 * | 9/2006 | Kelley ..................... | H04L 67/18 709/206 |
| 2006/0294199 A1 * | 12/2006 | Bertholf ................ | G06F 16/972 709/217 |
| 2007/0185718 A1 * | 8/2007 | Di Mambro ............ | G06F 21/32 704/273 |
| 2011/0187511 A1 * | 8/2011 | Boldyrev ................. | H04Q 5/22 340/10.51 |
| 2014/0032904 A1 * | 1/2014 | Margalit ............. | G06F 21/6281 713/168 |
| 2015/0271158 A1 * | 9/2015 | Ronca ................... | H04L 9/0819 713/168 |
| 2016/0125414 A1 * | 5/2016 | Desai ................. | G06Q 20/4014 705/17 |

(Continued)

FOREIGN PATENT DOCUMENTS

CN          102662797 A    *  9/2012

*Primary Examiner* — Evral E Bodden
(74) *Attorney, Agent, or Firm* — Davis Wright Tremaine LLP

(57) ABSTRACT

A host application installed on a computing device detects that the computing device is in proximity of a location associated with another application that can be installed onto the computing device. As a result of the computing device being in proximity of the location, the host application obtains, from an application vending server, application code for the application. The host application uses the application code to install the other application onto the computing device. If the host application detects that the computing device is no longer in proximity of the location, the host application uninstalls the other application from the computing device.

22 Claims, 8 Drawing Sheets

(56) References Cited

U.S. PATENT DOCUMENTS

2019/0053039 A1\* 2/2019 Chastain ................ H04W 8/02
2021/0058748 A1\* 2/2021 Liao ..................... H04W 76/11

\* cited by examiner

AUTOMATIC APPLICATION INSTALLATION BASED ON PROXIMITY DETECTION

BACKGROUND

Customers of computing resource service providers and other service providers often utilize applications installed on their computing devices in order to interact with these service providers and other customers. However, it can be tedious for customer to install myriad applications on their computing devices for each service provider that it interacts with. Further, customers may not be aware that an application provided by a service provider exists, which can prevent these customers from being able to interact with the service provider or to take advantage of functionality provided by the service provider. Customers may also not want to spend the time required to install these applications on to their devices or otherwise clutter their devices with applications that they may view as being unnecessary.

BRIEF DESCRIPTION OF THE DRAWINGS

Various techniques will be described with reference to the drawings, in which.

DETAILED DESCRIPTION

Figure 1:
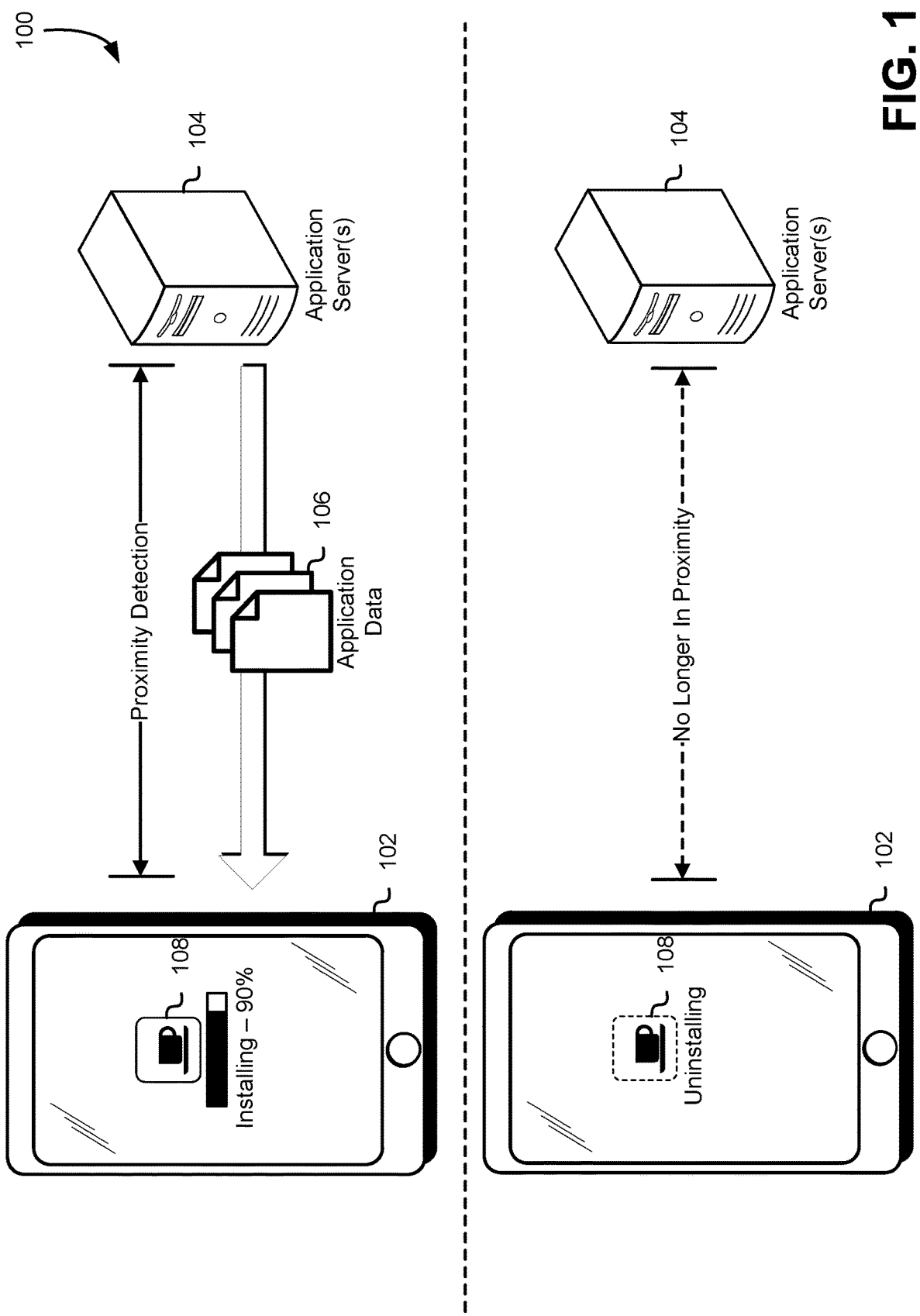
FIG. 1 shows an illustrative example of a system in which various embodiments can be implemented.

Techniques described and suggested herein relate to the automatic installation and uninstallation of applications on computing devices based on the proximity of the computing devices to an application vending server. In an example, a host application installed on a computing device detects that the computing device is in proximity of an application vending server. The host application may leverage peripheral devices of the computing device (e.g., Global Positioning System (GPS) receivers, near-field communication (NFC) antennae, wireless communications network antennae, etc.) to determine proximity to the application vending server. If the host application determines that the computing device is in proximity to the application vending server, the host application may determine which application can be obtained from the application vending server for installation on the computing device. Based on this determination, the host application may evaluate any existing permissions for allowable applications to determine whether the application made available through the application vending server may be installed on to the computing device.

In one example, if the host application determines that the application can be installed on to the computing device, the host application obtains the application data usable to install the application on to the computing device from the application vending server. In some instances, the host application may determine whether the application data usable to install the application is available via a cache of the computing device. If the application data is available in a local cache of the computing device, the host application may use this data to install the application without having to access the application vending server. Once the application is installed on the computing device, the host application determines whether additional information (e.g., user data, etc.) is required to provide additional functionality for the application in accordance with the set of permissions. For instance, if the application is usable for payments at a retail location, the host application may determine whether the user's payment information is needed to enable use of the application for payments at the retail location. If additional information is required, the host application may, through the computing device, prompt the user for this additional information, which may be used to enable functionality of the newly installed application. In some instances, the host application may transmit a request to the application vending server or other entity to obtain the additional information. The host application may launch the newly installed application on the computing device to enable use of the newly installed application by the user.

In an example, in order for the application to be installed on the computing device, a quorum of computing devices within geographic proximity of the application vending server that approve of installation of the application is required. For instance, if an application vending server detects that a computing device is in geographic proximity, the application vending server may identify any applications available for installation on to the computing device and any permissions associated with these applications. Permissions for a particular application may specify that a quorum of computing devices indicating approval of installation is required. If so, the application vending server may identify the group of computing devices subject to the quorum requirement and transmit a request to each computing device of the group to obtain authorization for installation of the application. If a quorum is achieved and the application can be installed on to the computing devices in geographic proximity to the application vending server, the application vending server may transmit application data to these computing devices to enable installation of the application. Alternatively, the application vending server may transmit a command to the computing devices to enable the host application on each computing device of the group to install the application.

In an example, the host application on the computing device also determines whether the computing device is no longer in geographic proximity to an application vending server associated with an application installed on the computing device. If the host application determines that the computing device is no longer in geographic proximity to the application vending server or other geographic location associated with the application, the host application may determine whether the application is to be uninstalled from the computing device. For instance, the host application, through the computing device, may prompt the user of the computing device to determine whether it wants to keep the application on the computing device. The user may provide, through the computing device, an indication of whether it wants to maintain the application on the computing device. If the host application determines that the application is to be uninstalled from the computing device, the host application may do so. In some examples, the host application maintains certain application data within a computing device cache to enable future installation of the application without need to access the application vending server to obtain the application data. Alternatively, the host application may delete any application data and user information associated with the application from the computing device.

As one skilled in the art will appreciate in light of this disclosure, certain embodiments may be capable of achieving certain advantages. For instance, because the host application installs the application when the computing device is in geographic proximity to an application vending server or other specific geographic location, the computing device may maintain available resources for other uses while the computing device is not within geographic proximity of the application vending server of other specific geographic location. Further, this advantage is achieved by uninstalling the application once the computing device is no longer in geographic proximity to the application vending server or other specific geographic location. Maintaining application data in a cache upon uninstallation of an application provides an additional advantage, as this data may be used to re-install an application if the computing device comes into geographic proximity of the application vending server or a specific geographic location at a later time without need to interact with the application vending server to obtain the data anew. This may reduce the network bandwidth usage for both the computing device and the application vending server.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of a system 100 in which various embodiments can be implemented. In the system 100, a host application installed on a computing device 102 detects that the computing device 102 is in geographic proximity of one or more application vending servers 104. In some embodiments, the computing device 102 is a mobile (e.g., portable) computing device (e.g., tablet computers, laptop computers, wearable computers, smartphones, handheld game consoles, portable media players, personal digital assistants, digital media players, etc.). The computing device 102 may include a host application that is installed on the computing device 102. The host application may interact with one or more peripheral devices of the computing device 102 to scan the surrounding environment in which the computing device 102 is located to determine whether the computing device 102 is within geographic proximity of one or more application vending servers 104.

In an embodiment, the host application installed on the computing device 102 serves as a container instance that is configured to launch and run other applications on the computing device 102 in a sandbox (e.g., isolated from other application environments of the computing device 102) environment. In some examples, a "container instance" may refer to a computer system instance (virtual or non-virtual, such as a physical computer system running an operating system) that is configured to launch and run software containers (e.g., applications). When an application is launched by the host application, it is isolated from other processes running on the computing device 102. Thus, the application may run on an operating system (e.g., using memory, CPU, and storage allocated by the operating system) of the host application and execute in isolation from other applications executed by the host application. Each application executed by the host application may have its own namespace, and functionality of the application is isolated by only relying on access to resources available within the container namespace. The applications executed by the host application may be launched to have only specified resources from resources allocated to the host application; that is, an application may be launched to have a certain amount of memory and to be guaranteed at least a specified amount of processing power by the host application.

The one or more application vending servers 104 may make an application 108 available for installation on to the computing device 102 if the computing device 102 is within geographic proximity of an application vending server 104 or a particular geographic location. In an embodiment, an application vending server 104 broadcasts a unique service set identifier (SSID) or other unique identifier associated with a located area network. The host application, via the computing device 102, may detect this SSID and determine that the computing device 102 is now in geographic proximity to the application vending server 104. In an embodiment, the host application obtains GPS coordinates from a GPS antenna of the computing device 102 to determine the location of the computing device 102. The host application may cross-reference these GPS coordinates with coordinates for specific geographic locations associated with an application vending server 104. Based on this cross-referencing of coordinates, the host application may determine whether the computing device 102 is within geographic proximity of an application vending server 104. In some instances, the host application may transmit, via the computing device 102, the obtained GPS coordinates to the application vending server 104, which may determine whether the computing device 102 is within geographic proximity of the application vending server 104 or of a particular geographic location associated with the application vending server 104.

In an embodiment, the host application uses, via the computing device 102, short-range wireless communication methods to determine geographic proximity to an application vending server 104. For instance, the host application may utilize near-field communication (NFC) protocols to determine whether an application vending server 104 also utilizing these protocols is within range. Similarly, the host application may rely on a wireless technology standard (e.g., Bluetooth®, etc.) to communicate with an application vending server 104 and determine whether the computing device 102 is within geographic proximity of the application vending server 104. These NFC protocols and wireless technology standards may require that the computing device 102 be within range of another device utilizing these protocols and/or standard to enable communication between these devices. Thus, geographic proximity may be determined if the computing device 102 is within range of an application vending server 104 utilizing these protocols and/or standards.

Geographic proximity to an application vending server 104 or a specific geographic location associated with an application vending server 104 may be determined based on a set of permissions maintained by the host application and/or by the application vending servers 104. For instance, a set of permissions for the computing device 102 may specify that the computing device 102 is to be within a particular distance from an application vending server 104 or a particular geographic location in order to enable the host application to request application data from an application vending server 104. This distance may be distinct from the distance required by the computing device 102, based on a wireless communications protocol, to detect presence of an application vending server 104. For example, although the host application, may detect the computing device 102, may detect the SSID of an application vending server 104, the host application may be unable to communicate with the application vending server 104 until the computing device 102 is within a specified distance of the application vending server 104.

In an embodiment, geographic proximity requirements are based on the size of the application made available by the application vending server 104. For instance, larger applications may be made available to computing devices within a larger radius of an application vending server or specific geographic location to enable a greater opportunity to obtain the application data for the application. Alternatively, smaller applications may be made available to computing devices within a smaller radius of an application vending server or specific geographic location, such as through a short-range communications standard and/or protocol. The geographic proximity requirements may also be based on the use case of the application itself. For example, if the application is provided for use in a particular location (e.g., retail location, office, etc.), the application may be made available by an application vending server 104 if the computing device 102 is within the confines of the particular location (e.g., inside the office, inside a retail location, etc.).

The set of permissions maintained by the host application may also specify which applications may be installed on the computing device 102. For instance, the set of permissions may specify identifiers corresponding to applications that may be installed on the computing device 102. Alternatively, the set of permissions may include an ordering of prohibited applications that are not to be installed on the computing device 102. Thus, based on the set of permissions maintained by the host application, the host application may determine whether an application made available by an application vending server 104 may be installed on the computing device 102.

In an embodiment, if the host application determines that the computing device 102 is within geographic proximity of an application vending server 104 or of a specific geographic location associated with an application vending server 104, the host application transmits a request to the application vending server 104 to obtain application data 106 usable to install the application 108 on to the computing device 102. The request from the host application may include a digital signature, which the application vending server 104 may utilize to authenticate the host application. For instance, the application vending server 104 may utilize a cryptographic key to decrypt the digital signature and compare the digital signature hash value to the hash value generated from applying a hash function to the request. If these hash values match, the application vending server 104 may determine that the request is authentic. Similarly, the response from the application vending server 104 may be digitally signed with a digital signature of the application vending server 104. The host application may verify the authenticity of the response based on the digital signature of the application vending server 104. In an embodiment, the host application obtains a digital certificate from another application on the computing device 102 that may be associated with the one or more application vending servers 104. This other application may be required on the computing device 102 to enable the host application to digitally sign requests to the one or more application vending servers 104 to obtain application data 106 for installation of the application 108. Thus, other applications on the computing device 102 may be used to establish a digital certificate trust chain to enable secure communication between the host application and the one or more application vending servers 104. Further, this digital certificate trust chain may be used to prevent communication between the host application and unverified application vending servers.

The request from the host application to the one or more application vending servers 104 may specify the programmatic languages supported by the host application, as well as the operating system in which the application 108 is to function. The one or more application vending servers 104 may utilize this information to provide application data 106 corresponding to a supported programmatic language and usable to install the application 108 for execution in the specified operating system. Further, this enables the host application to define the sandbox environment for execution and isolation of the application 108 from other applications of the computing device 102. Further, the application data 106 may be compiled for specific hardware of the computing device 102. For instance, the application data 106 may be compiled to enable use of the application with peripheral devices of the computing device 102. The host application may control access rights to these peripheral devices such that the host application determines whether the application 108 is permitted to access these peripheral devices for a stated purpose.

The host application may obtain the application data 106 from the one or more application vending servers 104 and use the application data 106 to install the application 108 on to the computing device 102. Once the application data 106 has been transmitted to the computing device 102 or to a virtual computing instance associated with the host application, the application 108 is installed for use by a user of the computing device 102. In an embodiment, instead of installing the application 108, the host application causes the computing device 102 to indicate that the application 108 is available for installation. This enables the user of the computing device 102 to determine whether installation of the application 108 is to proceed. If the user determines that the application is not to be installed, the host application may maintain the application data 106 in a cache while the computing device 102 is in geographic proximity of the one or more application vending servers 104 or of a particular geographical location associated with the one or more application vending servers 104. The user of the computing device 102 may, thus, request installation of the application 108 on to the computing device 102 or the virtual machine instance while the computing device 102 is in geographic proximity of the one or more application vending servers 104 or of a particular geographical location associated with the one or more application vending servers 104.

In an embodiment, the host application maintains additional information usable by the application 108 for various purposes. For example, if the application 108 is usable to provide payment information to a vendor at a particular location, the application 108 may transmit a request, such as through an application programming interface (API) call, to the host application to obtain the payment information of the user of the computing device 102. The host application may verify that the application 108 has not been tampered with or has otherwise become compromised. If the application 108 is authentic, the host application may provide the additional information to the application 108 for the stated purpose.

In an embodiment, the host application verifies that an application vending server 104 is authentic and causes the application vending server 104 to transmit the application data 106 to a virtual computing instance instantiated on to a server in a remote network. The virtual computing instance may provide a sandbox environment for execution of the application 108. Thus, the application 108 may be installed on to the virtual computing instance, such that the host application may access the virtual computing instance to provide the application's functionality to the computing device 102 over the remote network.

The host application may continue to monitor the location of the computing device 102 to determine whether the computing device 102 is still within geographic proximity of the one or more application vending servers 104 that provided the application data 106 for the application 108 or of the specific geographic location associated with the one or more application vending servers 104. In an embodiment, if the host application determines that the computing device 102 is no longer in geographic proximity of the one or more application vending servers 104, the host application uninstalls the application 108 from the computing device 102. In an embodiment, the host application maintains the application data 106 of the application 108 in a cache of the computing device for future installations of the application 108. The application data 106 may be maintained in this cache for a limited amount of time such that if the application 108 is not re-installed within this limited amount of time, the cache is cleared and the application data 106 is removed from the computing device 102. However, if the host application determines that the computing device 102 is in geographic proximity of the one or more application vending servers 104 or of a specific geographic location for use of the application 108, the host application may obtain the application data 106 from this cache, if available, and re-install the application 108 on to the computing device 102. This may obviate the need to access the one or more application vending servers 104 to obtain the application data 106.

In an embodiment, if the host application determines that the computing device 102 is in geographic proximity of the one or more application vending servers or of a specific geographic location for use of the application 108, the host application provides information related to the application data maintained in the cache of the computing device 102 to an application vending server. The information may include the application name, the application version, a hash of the application data, and the like. In response to obtaining this information from the host application, the application vending server may evaluate the information to determine what additional and/or alternative application data is to be provided to the host application, if any, for installation of the application 108 on to the computing device 102. For example, if the application data stored in the cache corresponds to an earlier version of the application 108, the application vending server may transmit application data usable to update the application to the latest version rather than transmitting the entirety of the application data usable for installation of the application 108. Alternatively, if the application vending server determines that the cached application data has been corrupted, the application vending server may transmit the application data anew to the host application. This may cause the host application to discard the corrupted application data from the cache and utilize the newly obtained application data for installation of the application 108.

In an embodiment, if the host application determines that the computing device 102 is no longer in geographic proximity of the application vending server or a location associated with the application vending server, the host application encrypts the application data, uninstalls the application, and stores the encrypted application data in the cache. Further, the host application may remove from the computing device 102 the cryptographic key utilized to encrypt the application data. This may prevent unauthorized access to the application data while the computing device 102 is outside of geographic proximity of the application vending server or other location associated with the application vending server. If the host application determines that the computing device 102 is again within geographic proximity of the application vending server or other location associated with the application vending server, the host application may obtain the cryptographic key from the application vending server. The host application may use this cryptographic key to decrypt the application data from the cache and to re-install the application on to the computing device 102.

In some instances, the host application may prompt the user of the computing device 102 to determine whether it would like to maintain the application 108 on the computing device 102. This enables the user to determine whether it would like to uninstall the application or to keep the application installed on the computing device 102 for later use. The host application may maintain a digital cookie usable to associate user information with the application 108. Thus, if the application 108 is re-installed on to the computing device 102, the cookie may be utilized to associate the user's information with the application 108 and enable the host application to provide this information to the application 108 as needed. In an embodiment, the host application transmits a notification via the computing device 102 to the user to indicate that the application 108 is to be uninstalled from the computing device 102 if the computing device 102 is not returned into geographic proximity to the application vending server or other location associated with the application vending server within a period of time. Thus, if the period of time elapses and the computing device 102 is not returned into geographic proximity of the application vending server or location associated with the application vending server, the host application may remove the application 108 from the computing device 102. However, if the host application detects that the computing device 102 is within geographic proximity of the application vending server or other location associated with the application vending server within the period of time, the host application may maintain the application 108 on the computing device 102.

In an embodiment, the host application provides users of the computing device 102 with an option to install the application 108 on to the computing device 102 while the computing device 102 is not in geographic proximity of the one or more application vending servers 104 or of a particular geographic location associated with the one or more application vending servers 104. For instance, while the application 108 may be installed automatically while the computing device 102 is in geographic proximity of the one or more application vending servers 104 or of the particular geographic location associated with these servers 104, the host application may obtain the application data 106 from the one or more application vending servers 104 while the computing device 102 is not in geographic proximity of the servers 104 or of the particular geographical location if the user affirmatively indicates, via the computing device 102, that it wishes to have the application 108 installed on its computing device 102.

Figure 2:
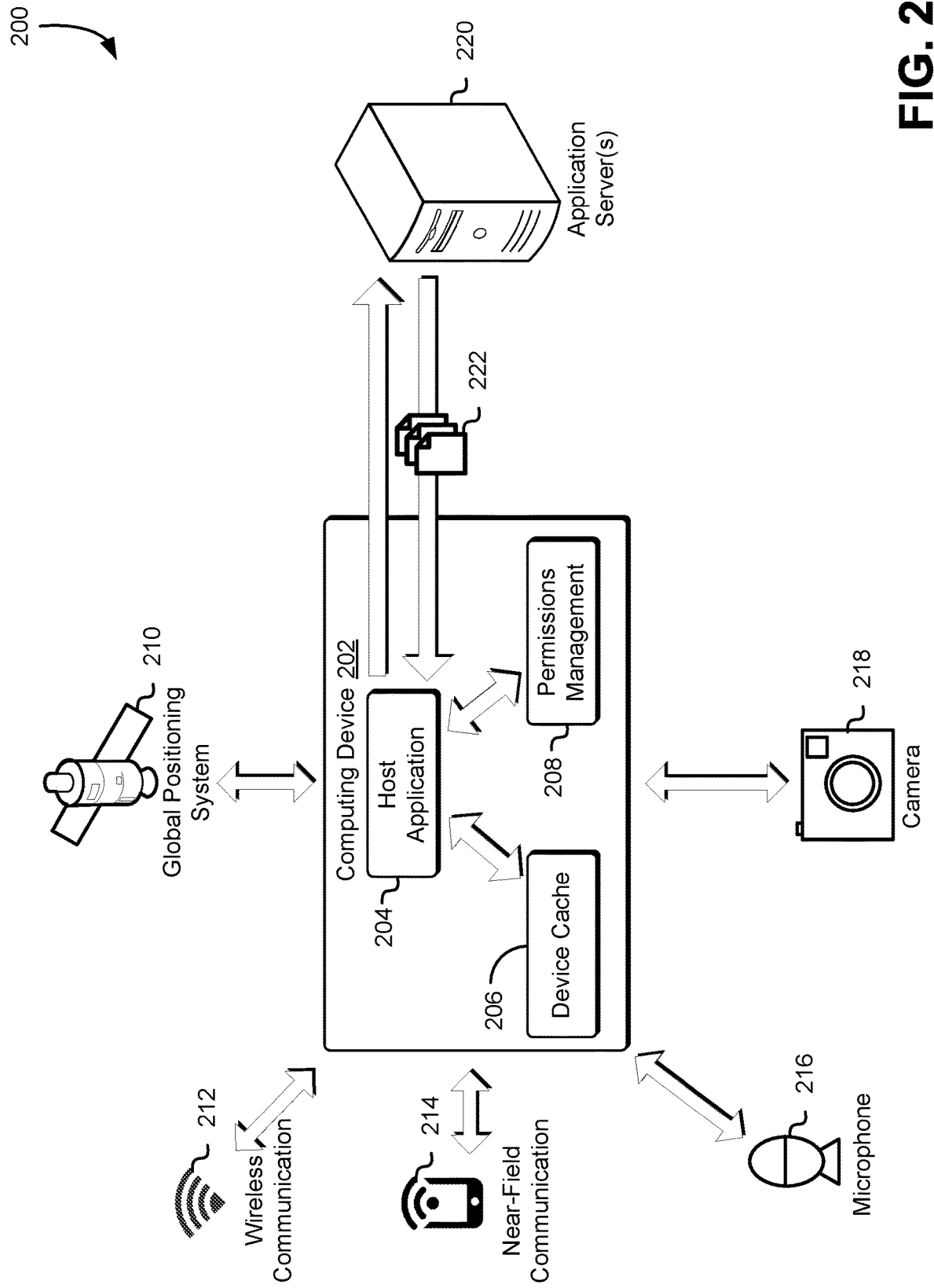
FIG. 2 shows an illustrative example of a system in which a host application installed on a computing device obtains, as a result to proximity to an application vending server, application data usable to install an application on to the computing device in accordance with at least one embodiment.

FIG. 2 shows an illustrative example of a system 200 in which a host application 204 installed on a computing device 202 obtains, as a result to geographic proximity to an application vending server 220, application data 222 usable to install an application on to the computing device in accordance with at least one embodiment. In the system 200, the host application 204 installed on the computing device 202 interacts with one or more peripheral devices of the computing device 202 to determine whether the computing device 202 is within geographic proximity of an application vending server 220 or a particular location associated with the application vending server 220 (e.g., a storefront, an office, etc.). For instance, the host application 204 may initiate these one or more peripheral devices to scan the environment upon initialization (e.g., by user command, upon initialization of the computing device 202, etc.) or in response to a triggering event (e.g., notification received from a service provider associated with the application vending server 220, etc.).

In this particular illustrative example, the host application 204 may interact with at least five types of peripheral devices. The peripheral devices that may be installed on the computing device 202, in this example, include a GPS antenna 210, a wireless communication antenna 212, an NFC antenna 214, a microphone 216, and a camera 218, although not all embodiments of the present disclosure will include all such peripheral devices and additional peripheral devices may be installed on the computing device 202 in addition to or as an alternative to the peripheral devices explicitly described herein.

The GPS antenna 210 may be installed on the computing device 202 to identify the location of the computing device 202 on Earth's surface. The GPS antenna 210, along with an integrated GPS receiver installed on the computing device 202, may be used to communicate with four or more satellites orbiting Earth to determine a distance between the GPS receiver and each of the four or more satellites. Further, the GPS receiver may receive the location of these four or more satellites orbiting the Earth's surface from each of these satellites in the form of radio signals. With this information, the GPS receiver may utilize three-dimensional trilateration to calculate the location of the GPS receiver on the Earth's surface. Thus, the GPS antenna 210 and GPS receiver may be utilized to determine whether the computing device is being utilized in geographic proximity to an application vending server 220 or another location on the Earth's surface that is associated with the application vending server 220. Location may also be determined in other ways in accordance with various embodiments. For example, a location determination module may also be stored in memory (e.g., module of executable code) to determine the location of the computing device 202. The location determination module may determine location using network positioning services or facilities. For example, the host application 204 may query a cellular data carrier to provide positioning information for the computing device 202 based at least in part on time-difference-of-arrival data to several cellular radio sites. The location determination module may also receive information from data networks or third-party providers which associate a particular network address to a particular location. For example, the internet protocol address of 206.33.56.105, a media access control address 04:00:12:03:11:A1 of a wireless access point, or both may be associated with the street address of 935 Pennsylvania Avenue Northwest in Washington, D.C.

The wireless communication antenna 212 may be installed on the computing device 202 to identify available wireless communication networks within range of the wireless communication antenna 212 and, hence, the computing device 202. The wireless communication networks may each be identified via a unique SSID, which may be broadcast wirelessly. Thus, the SSID for each wireless communication network may be evaluated by the host application 204 to determine whether any of these SSIDs correspond to a wireless communication network of an application vending server 220 or other computing device associated with the application vending server 220. In some instances, the host application 204 may utilize network positioning services or facilities to determine not only the location of the computing device 202, but also of the application vending server 220 or other computing device associated with the application vending server 220. With this information, the host application 204 may determine the distance between the computing device 202 and the application vending server 220 or other computing device associated with the application vending server 220. Based on this distance, the host application 204 may determine whether the computing device 202 is within a geographic proximity threshold of the application vending server 220/other computing device associated with the application vending server 220.

The NFC antenna 214 may be installed on the computing device 202 to enable communication between the computing device 202 and other devices utilizing a particular set of wireless communication protocols. These wireless communication protocols require that the computing device 202 and other devices be within a short distance from each other (e.g., 1-5 inches). Thus, in order for the host application 204 to detect an application vending server 220 or other computing device associated with the application vending server 220 using the NFC antenna 214, the computing device 202 may need to be within a short distance from the application vending server 220/other device. The host application 204 may determine that the computing device 202 is in geographic proximity of the application vending server 220/other device if it detects the application vending server 220/other device via the NFC antenna 214.

The computing device 202 may include a microphone 216, which may be used in conjunction with a microphone on an application vending server 220 or other computing device associated with the application vending server 220 to determine whether the computing device 202 is in geographic proximity of the application vending server 220/other computing device. For instance, the microphone 216 may be installed on the computing device to detect and record audio input from the surrounding environment. The microphone 216 may convert acoustic waves into electrical signals, which a processor may record into a digital file, which may be used by an audio software application to analyze the recorded audio input and, based on the analysis, determine certain characteristics of the audio input. The host application 204 may provide this digital file to a service associated with the one or more application vending servers to determine whether the computing device 202 is in geographic proximity to any of the one or more application vending servers. For example, the service may obtain audio samples from each application vending server 220. The service may compare these audio samples to the audio sample from the host application 204 to determine whether if the audio sample from the host application 204 is similar to an audio sample from an application vending server 220. If so, the service may transmit a notification to the host application 204 and to the identified application vending server 220 to indicate that the computing device 202 is in geographic proximity of the identified application vending server 220.

The camera 218 may be installed on the computing device for a variety of purposes. For instance, the camera 218 may be used to capture a pictographic (e.g., visual) representation of the surrounding environment, which may be used to determine, among other things, the characteristics of the surrounding environment. For instance, a user may utilize the camera 218 to capture a pictographic representation of a specific location, which the host application 204 may utilize to determine the characteristics of the location. The host application 204 may provide this information to a service that implements the application vending servers 220 to identify if the computing device 202 is in geographic proximity to a location associated with a particular application vending server 220. For example, if the user captures a pictographic representation of a particular storefront, the host application 204 may receive an indication that a particular application associated with the storefront is available from an application vending server 220. This may cause the host application to obtain the application data associated with the application from the application vending server 220 and/or prompt the user to provide a response to a query as to whether it wants to install such an application on the computing device 202. In an embodiment, the pictographic representation of the specific location includes temporal information usable to determine when the pictographic representation was obtained. For instance, the pictographic representation of the specific location may include a pictographic representation of a one-time code displayed at the specific location. This one-time code may be utilized by the application vending server 220 to determine when the pictographic representation of the location of obtained. This enables the application vending server 220 to provide a time limit for the computing device to obtain the pictographic representation and to transmit the pictographic representation to the application vending server 220 to obtain the application data. Other temporal information may be captured through use of the camera 218, such as a clock time, image displayed at the location at a particular time, etc.

In an embodiment, if the host application 204 determines that the computing device 202 is in geographic proximity to an application vending server 220, a computing device associated with an application vending server 220, or otherwise in a location associated with an application vending server 220, the host application 204 determines whether the application provided by the application vending server 220 can be installed on the computing device 202. The host application 204 may evaluate a set of permissions from a permissions management module 208 on the computing device 202 to determine whether the host application 204 is authorized to install the application on to the computing device 202. The permissions management module 208 is implemented on the computing device 202 using hardware and software and may be executed using executable instructions whose execution by the computing device 202 causes the permissions management module 208 to perform the operations described herein. The permissions management module 208 may maintain a set of permissions usable by the host application 204 to determine whether an application may be installed on to the computing device 202 or a virtual computing instance within a remote network environment. For instance, the set of permissions may specify identifiers corresponding to applications that may be installed on the computing device 202. Alternatively, the set of permissions may include an ordering of prohibited applications that are not to be installed on the computing device 202. The set of permissions may also specify parameters for determining if the computing device 202 is in geographic proximity to an application vending server 220, a computing device associated with the application vending server 220, or other location associated with the application vending server 220.

If the host application 204 determines, based on the set of permissions maintained by the permissions management module 208, that the application may be installed on the computing device 202, the host application 204 may determine whether application data of the application is maintained within a device cache 206 of the computing device 202. For instance, if the application was previously installed on the computing device 202, application data of the application may be stored in the device cache 206 for later re-installation of the application. If the application data of the application is stored in the device cache 206, the host application 204 may obtain the application data from the device cache 206 and install the application on to the computing device 202. However, if the application data is not stored in the device cache 206, the host application 204 may transmit a request to the application vending server 220 to obtain the requisite application data 222 usable to install the application on to the computing device 202 or on to a virtual computing instance accessible via the computing device 202.

As noted above, the host application 204 maintains additional information usable by the application for various purposes. For example, if the application is usable to provide payment information to a vendor at a particular location, the application may transmit a request, such as through an application programming interface (API) call, to the host application 204 to obtain the payment information of the user of the computing device 202. The host application 204 may verify that the application has not been tampered with or has otherwise become compromised. If the application is authentic (e.g., is not compromised, etc.), the host application 204 may provide the additional information to the application for the stated purpose. The host application 204 may also communicate with the application vending server 220 to obtain any additional data usable to update the application as needed. This additional data can include software patches, contemporaneous information presentable via the application, location-specific information presentable via the application, and the like.

In an embodiment, the host application 204 utilizes one or more peripheral devices of the computing device 202 to determine whether the computing device 202 is no longer in geographic proximity of the application vending server 220, of a computing device associated with the application vending server 220, or other location associated with the application vending server 220 designated for geographic proximity determinations. For instance, the GPS antenna 210 and GPS receiver may be utilized to determine whether the computing device is being utilized in a location that is no longer in geographic proximity to an application vending server 220 or another location on the Earth's surface that is associated with the application vending server 220. As another example, the host application 204 may determine that the computing device 202 is no longer in geographic proximity of the application vending server 220 in response to a termination of an NFC connection between the computing device 202 and the application vending server 220 or other computing device associated with the application vending server 220.

In an embodiment, if the host application 204 determines that the computing device 202 is no longer in geographic proximity of the application vending server 220, the host application 204 uninstalls the application from the computing device 202. The host application 204 may store the application data 222 of the application in the device cache 206 of the computing device 202 for future installations of the application. The application data 222 may be maintained in this device cache 206 for a limited amount of time such that if the application is not re-installed within this limited amount of time, the application data 106 is removed from the device cache 206. However, if the host application 204 determines that the computing device 202 is in geographic proximity of the one or more application vending servers 220 or of a specific geographic location for use of the application, the host application may obtain the application data 222 from this device cache 206, if available, and re-install the application on to the computing device 202. In an embodiment, the host application 204 determines whether a set amount of time has elapsed since detection of the computing device 202 being no longer in geographic proximity of the application vending server 220 or other location associated with the application vending server 220. The set amount of time may be determined based on the frequency in which the application is utilized on the computing device 202. This may generate a buffer for frequently used applications to avoid multiple installation cycles for these frequently used applications.

In an embodiment, the host application 204 can provide the application data 222 to another computing device that may be within geographic proximity of the computing device 202. For instance, the host application 204 may evaluate the application data 222 to determine which of the computing device 202 or other computing device would benefit most from having the application available through the respective computing device. As an illustrative example, if a user of the computing device 202 also utilizes a smartwatch device that is frequently utilized for providing payment information to vendors via a near-field communication connection, and the application is suited for this purpose, the host application 204 may transmit the application data 222 to the smartwatch device to enable installation and use of the application via the smartwatch instead of through the computing device 202. Thus, while proximity detection may be performed by the computing device 202, the application data 222 may be utilized by another computing device for installation of the application on to the other computing device.

Figure 3:
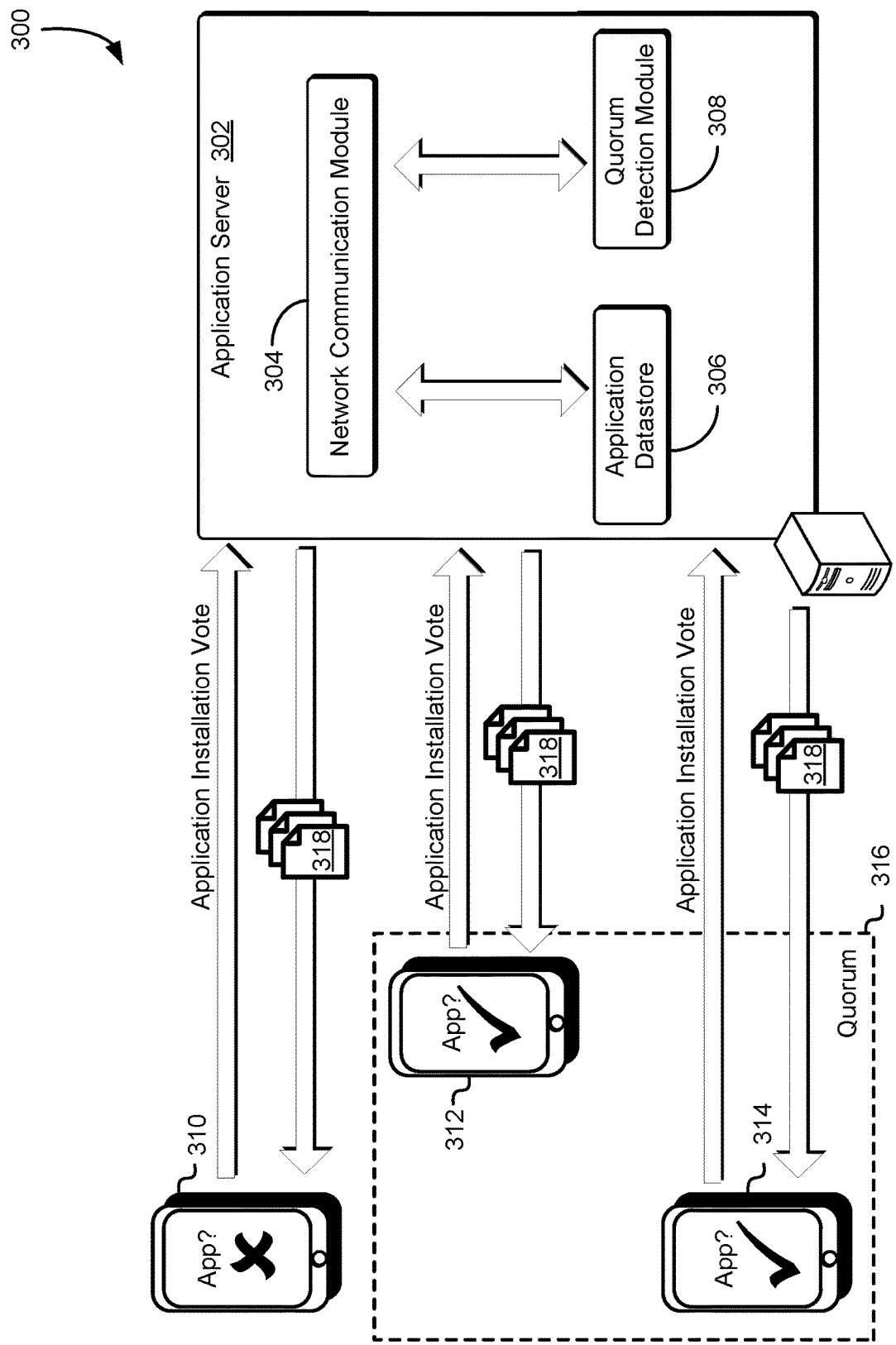
FIG. 3 shows an illustrative example of a system in which an application vending server determines whether a quorum of computing devices has been reached for providing application data to a set of computing devices in accordance with at least one embodiment.

In an embodiment, application data is provided to host applications of various computing devices dependent on whether a quorum among these various computing devices is reached, whereby the quorum authorizes installation of the application on the computing devices. Accordingly, FIG. 3 shows an illustrative example of a system 300 in which an application vending server 302 determines whether a quorum 316 of computing devices has been reached for providing application data 318 to a set of computing devices in accordance with at least one embodiment. In the system 300, an application vending server 302 receives, via a network communication module 304, a request from at least one computing device of a group of computing devices to obtain application data 318 usable to install an application onto the computing device. The request may be made by a host application installed on the computing device in response to detection of the computing device being in geographic proximity of the application vending server 302 or of a location associated with the application vending server 302. The network communication module 304 of the application vending server 302 may receive this request. The network communication module 304 may be a process executing on the application vending server 302 that is operable to process communications with computing devices and other devices over a network.

In response to the request, the network communication module 304 determines whether the computing device is a member of a group of computing devices for which authorization is required from the group of computing devices before the specified application may be installed on the computing device. For instance, the network communication module 304 may evaluate a set of permissions for the application to determine whether installation of the application on the computing device is subject to group authorization. The set of permissions may associate an identifier of the computing device with an identifier corresponding to the group of computing devices. Further, in an embodiment, the set of permissions specify one or more quorum rules for determining whether authorization has been provided for installation of the application on to the computing device. In an embodiment, a quorum is reached if the majority of responses from the set of computing devices indicate that either the application may be installed or not. In another embodiment, a quorum is reached if at least a minimum number of computing devices of the group designated as administrators or group leaders of the group indicate that the application may be installed or not. If a quorum is required to determine whether installation of the application is permitted, the network communication module 304 may provide responses from the computing devices of the group to a quorum detection module 308 of the application vending server 302.

The quorum detection module 308 may be a process executing on the application vending server 302 that is operable to process responses from computing devices of a group to determine whether a quorum has been reached for determining whether to enable installation of an application on computing devices of the group. In an embodiment, if a quorum is required, the quorum detection module 308 transmits, via the network communication module 304 and to the computing devices of the group, a request to provide a response as to whether the application may be installed on the computing devices of the group. In an embodiment, the quorum detection module 308, via the network communication module 304, determines whether a quorum can be achieved based on the number of computing devices of the group that are in geographic proximity to the application vending server 302 or other location associated with the application vending server 302. For example, if the application vending server 302 is located in a particular conference room, the quorum detection module 308 may determine whether the requisite number of computing devices of the group is present in the conference room. If a quorum cannot be achieved based on the number of computing devices of the group in geographic proximity of the application vending server 302 or other location associated with the application vending server 302, the quorum detection module 308 may determine whether a timeout period has elapsed. The timeout period may define the period of time that is available before a determination that a quorum cannot be reached is made. As an illustrative example, if the application is to be made available from the beginning of a conference to the end of a conference, the timeout period may be defined as a period of time starting at a time before the beginning of the conference and ending at the time of the beginning of the conference. Thus, if by the beginning of the conference a quorum has not been reached, the quorum detection module 308 may prevent installation of the application on computing devices of the group.

If the quorum detection module 308 determines that at least a minimum number of computing devices of the group are present for establishing a quorum, the quorum detection module 308 may transmit a request to each computing device of the group within geographic proximity of the application vending server 302 or location associated with the application vending server 302 to provide an authorization response for installation of the application on to the computing devices of the group. Users of these computing devices may provide an authorization response, indicating whether the application may be installed on the computing devices. As the quorum detection module 308 receives responses from the computing devices of the group, the quorum detection module 308 may determine whether a quorum has been reached. If a quorum has been reached, the quorum detection module 308 determines, based on the quorum response, whether the application can be installed on the computing devices. If so, the quorum detection module 308 causes the network communication module 304 to transmit the application data 318 from an application datastore 306 to the computing devices 310-314 of the group. This enables the host application on each of these devices to install the application.

By way of example, and as illustrated in FIG. 3, the quorum detection module 308 receives an authorization vote from each of the computing devices 310-314 that are in geographic proximity of the application vending server 302 or other location associated with the application vending server 302. The computing device 310 has indicated that the application should not be made available to the group. However, the computing devices 312-314 have indicated that the application should be made available to the group. The quorum detection module 308 may evaluate these votes against the quorum rules specified in the set of permissions for the application to determine whether a quorum has been reached. In this particular example, the quorum detection module 308 has determined that a quorum 316 has been reached as a result of two computing devices of the group (e.g., computing devices 312-314) having indicated an identical authorization response. Based on the quorum, the quorum detection module 308 determines that the application can be installed on computing devices of the group and causes the network communication module 304 to transmit the application data 318 to the computing devices 310-314 of the group, as these computing devices 310-314 are in geographic proximity of the application vending server 302 or of a location associated with the application vending server 302.

In an embodiment, the quorum detection module 308 determines whether a quorum has been reached for enabling of the application or of certain functionality of the application on the computing devices of the group. For instance, once the application is installed on the computing devices, each computing device may prompt its user to provide an authorization vote usable to determine whether functionality of the application is to be enabled while computing devices of the group are within geographic proximity of the application vending server 302 or other location associated with the application vending server 302. Similar to the process described above for determining whether application data 318 may be provided to the computing devices of the group for installation of the application, the quorum detection module 308 may evaluate these votes against the quorum rules specified in the set of permissions for the application to determine whether a quorum has been reached. If a quorum has been reached, the quorum detection module 308 may determine whether the quorum determination is to enable functionality of the application or to prevent use of this functionality. If the quorum detection module 308 determines that the quorum has authorized use of the requested functionality, the quorum detection module 308 may transmit, via the network communication module 304 and to the computing devices of the group, executable instructions to cause the host application on each computing device to enable the functionality of the application.

Figure 4:
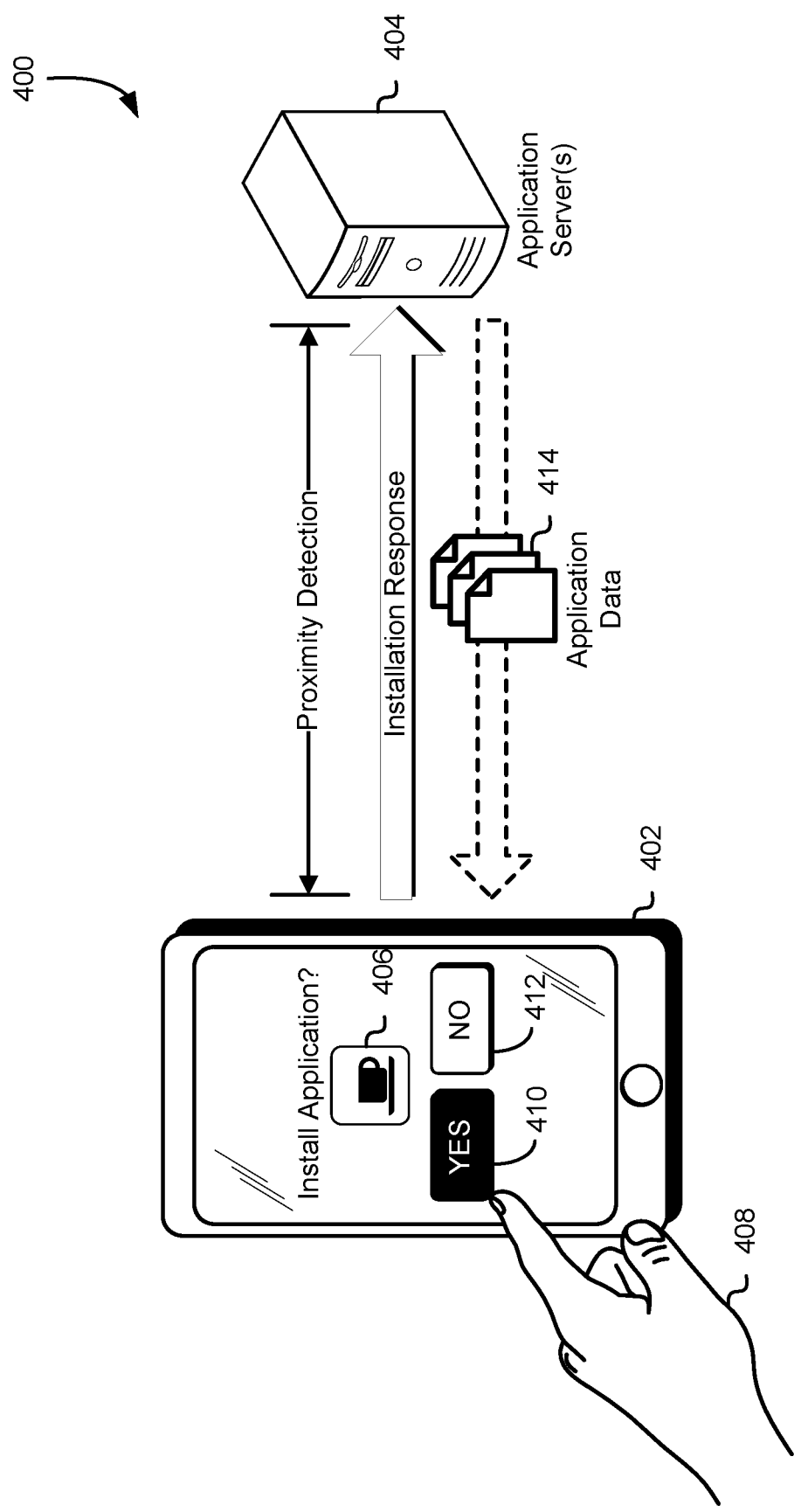
FIG. 4 shows an illustrative example of a system in which a computing device prompts a user to determine whether to proceed with installation of an application in response to an indication of proximity to an application vending server in accordance with at least one embodiment.

As noted above, a host application on a computing device may determine whether the computing device is in geographic proximity of an application vending server or location associated with an application vending server. If so, the host application may determine that an application is available for installation on the computing device. In an embodiment, the host application prompts, via the computing device, the user to determine whether to install the application on to the computing device. Accordingly, FIG. 4 shows an illustrative example of a system 400 in which a computing device 402 prompts a user 408 to determine whether to proceed with installation of an application 406 in response to an indication of geographic proximity to an application vending server 404 in accordance with at least one embodiment.

In the system 400, a host application utilizes one or more peripheral devices of the computing device 402 to detect geographic proximity of the computing device 402 to one or more application vending servers 404 or to a location associated with one or more application vending servers 404. In an embodiment, if the host application determines that the computing device 402 is in geographic proximity to an application vending server 404 or in a location associated with an application vending server 404, the host application determines whether the application provided by the application vending server 404 can be installed on the computing device 402. The host application may evaluate a set of permissions from a permissions management module on the computing device 402 to determine whether the host application is authorized to install the application on to the computing device 402. The permissions management module may maintain a set of permissions usable by the host application to determine whether an application may be installed on to the computing device 402 or a virtual computing instance within a remote network environment.

If the host application determines, based on the set of permissions maintained by the permissions management module, that the application 406 may be installed on the computing device 402, the host application may cause the computing device 402 to prompt the user 408 to determine whether it would like to have the application 406 installed on the computing device 402. For example, the computing device 402 may present, via a graphical user interface (GUI) of the computing device 402, with a description of the application 406 and a method for providing authorization for installation of the application 406. The method may include, as illustrated in FIG. 4, presenting the user 408 with a "YES" graphical button 410 and a "NO" graphical button 412. If the user 408 selects the "YES" graphical button 410, the host application may determine that the user has authorized installation of the application 406 on to the computing device 402. Alternatively, if the user 408 selects the "NO" graphical button 412, the host application may determine that the user 408 does not want to have the application installed on the computing device 402.

If the user 408 specifies that the application 406 may be installed on the computing device 402, the host application may determine whether application data of the application 406 is maintained within a device cache of the computing device 402. For instance, if the application was previously installed on the computing device 402, application data of the application 406 may be stored in the device cache for later re-installation of the application 406. If the application data of the application 406 is stored in the device cache, the host application may obtain the application data from the device cache and install the application 406 on to the computing device 402. However, if the application data is not stored in the device cache, the host application may transmit a request to the application vending server 404 to obtain the requisite application data 414 usable to install the application 406 on to the computing device 402 or on to a virtual computing instance accessible via the computing device 402. Thus, application data 414 may be accessed if the user 408 authorizes installation of the application 406 on the computing device 402.

Figure 5:
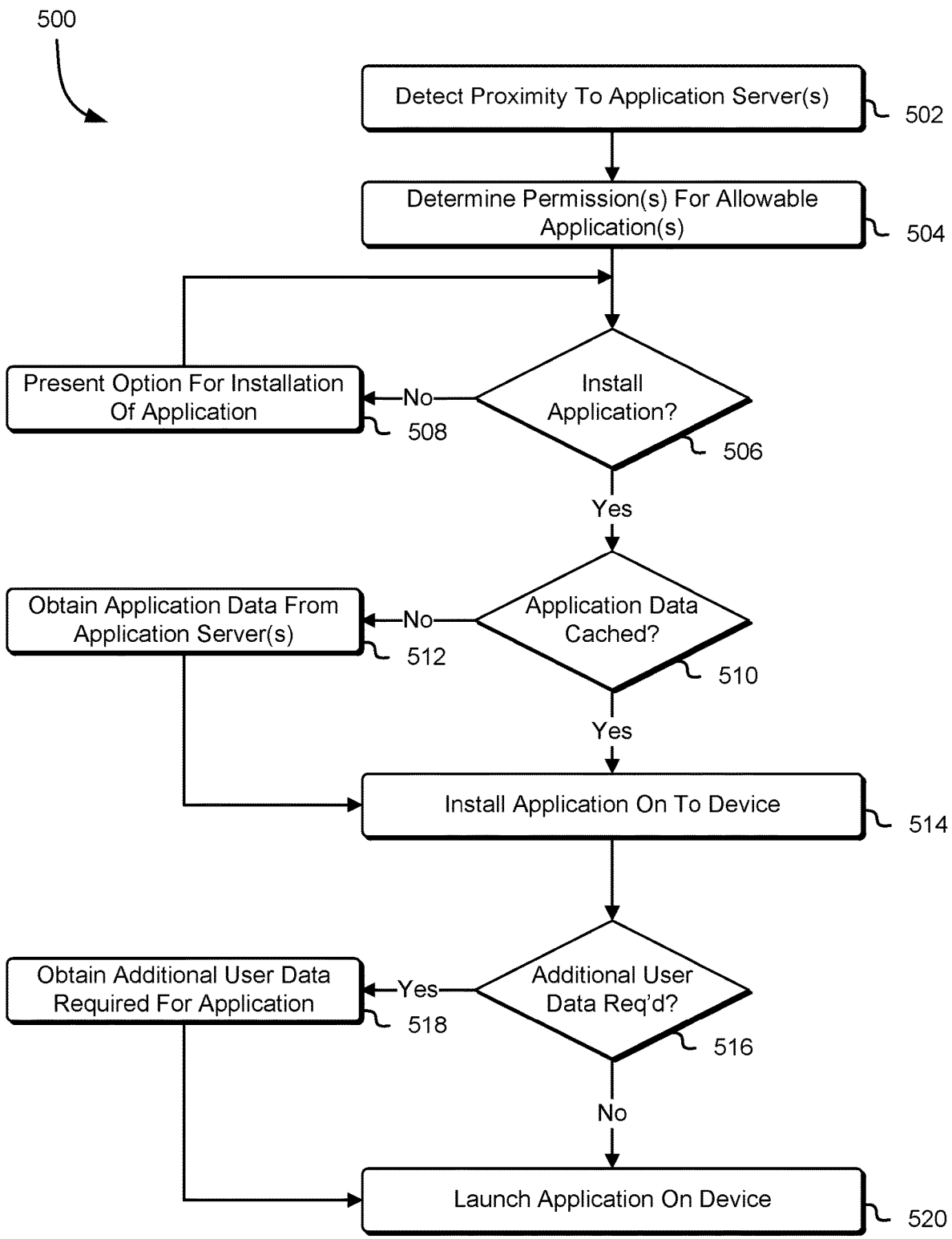
FIG. 5 shows an illustrative example of a process for installing an application on to a computing device as a result of the computing device being in proximity to application vending servers in accordance with at least one embodiment.

As noted above, a host application installed on a computing device may cause the computing device to utilize peripheral devices to obtain measurements and other information about the surrounding environment. Based on this information, the host application may determine whether the computing device is in geographic proximity of an application vending server or other location associated with the application vending server. The application vending server may make available application data usable to install an application on to the computing device. Thus, if the computing device is in geographic proximity to the application vending server or other location associated with the application vending server, the host application may obtain the application data from the application vending server and install the application on to the computing device. Accordingly, FIG. 5 shows an illustrative example of a process 500 for installing an application on to a computing device as a result of the computing device being in geographic proximity to application vending servers in accordance with at least one embodiment. The process 500 may be performed by the aforementioned host application, which may install the application on to the computing device in response to detecting that the computing device is in geographic proximity of the application vending server or a location associated with the application vending server.

In an embodiment, the host application operating on a computing device detects 502 that the computing device is in geographic proximity to an application vending server or location associated with an application vending server. For instance, the host application may obtain GPS coordinates from a GPS antenna of the computing device to determine the location of the computing device. The host application may cross-reference these GPS coordinates with coordinates for specific geographic locations associated with an application vending server. Based on this cross-referencing of coordinates, the host application may determine whether the computing device is within geographic proximity of an application vending server. As another example, the host application may evaluate the SSID for each wireless communication network to determine whether any of these SSIDs correspond to a wireless communication network of an application vending server or other computing device associated with the application vending server. In some instances, the host application may utilize network positioning services or facilities to determine not only the location of the computing device, but also of the application vending server or other computing device associated with the application vending server. With this information, the host application may determine the distance between the computing device and the application vending server or other computing device associated with the application vending server. Based on this distance, the host application may determine whether the computing device is within a geographic proximity threshold of the application vending server 220/other computing device associated with the application vending server.

In an embodiment, the host application receives a notification from an application vending server or other centralized server that maintains communication with the application vending servers and the computing device to indicate that the computing device on which the host application is installed is in geographic proximity of the application vending server. For instance, the host application may transmit, via the computing device, the location of the computing device. The application vending server or other centralized server may receive this information and determine the distance between the computing device and the application vending server. If the application vending server or other centralized server determines, based on this calculated distance, that the computing device is in geographic proximity of the application vending server, the application vending server or other centralized server may transmit a notification to the computing device to indicate that the computing device is in geographic proximity of the application vending server. This notification may cause the host application to detect 502 geographic proximity to the application vending server.

The host application may obtain, from the application vending server, information regarding the one or more applications that may be available for installation on to the computing device. This information may include the application name, the application version, the permissions required by the application to enable certain functionality of the application, privacy information, and the like. Based on this information, the host application may determine 504 the one or more permissions for installation of allowable applications on to the computing device. For instance, the host application may access, from a permissions datastore on the computing device, a set of permissions for installation of allowable applications on to the computing device. The set of permissions may be provided by a user of the computing device, who may define what applications may be installed on to the computing device, as well as the allowable functionality of the computing device that may be leveraged by these applications. The set of permissions may alternatively, or additionally, be provided by an administrator of the computing device (e.g., employer of the user, etc.). The set of permissions may be catalogued according to the applicable application (e.g., application name, application version, etc.), the applicable functionality of the computing device that is to be leveraged by an application, and the like. Thus, based on the information obtained from the application vending server, the host application may identify the applicable set of permissions for determining whether installation of the application is permitted. The host application may evaluate these one or more permissions and the information provided by the application vending server to determine 506 whether to install the one or more applications from the application vending server on to the computing device. For instance, if an application requires access to the user's digital photograph library on the computing device and the set of permissions on the computing device specify that use of this digital photograph library is prohibited, the host application may determine that installation of the application cannot be performed.

In an embodiment, if the host application determines that installation of the application is permitted, the host application causes the computing device to prompt the user of the computing device to determine whether the host application may proceed and install the application on to the computing device. If the user indicates that the application is not to be installed on the computing device, the host application may present 508, via the computing device, an option for installation of the application. This enables the user to install the application on to the computing device should it reconsider its initial rejection of the application. Alternatively, if the host application determines that the user does not want the application installed on to the computing device or that the application cannot be installed based on the set of permissions, the host application may prevent installation of the application on the computing device.

If the host application determines that the application is to be installed on to the computing device, the host application may determine 510 whether the application data usable to install the application is available within a data cache of the computing device. For instance, if the application was previously installed on the computing device and uninstalled, the computing device may maintain application data associated with the application in a data cache for a period of time. This application data may be used to reinstall the application on to the computing device. If the host application determines that the application data usable to install the application is not present in the data cache, the host application may obtain 512 the application data from the application vending server. For instance, the host application may transmit a request to the application vending server to obtain the application data. In an embodiment, the application vending server pushes the application data to computing devices within geographic proximity of the application vending server or location associated with the application vending server. If the application data is available in the data cache, the host application may compare the received application data to the application data stored in the data cache to identify any differences. If there are any differences, the host application may remove the application data from the cache and obtain the new application data from the application vending server.

In response to obtaining the application data from either the data cache or the application vending server, the host application may install 514 the application on to the computing device. In an embodiment, the host application determines 516 whether additional user data or other data is required to enable certain functionality of the application. For instance, if the application requires user login information to access a user's account via the application, the host application may obtain this information from the user, from a repository maintained by the host application, or from an account service that maintains the account information for the user. In an embodiment, the host application maintains a digital cookie usable to associate user information with the application. Once the application is installed on to the computing device, the cookie may be utilized to associate the user's information with the application and enable the host application to provide this information to the application as needed. Thus, if additional user data or other data is required to enable functionality of the application, the host application may obtain 518 this additional data. The host application may launch the application 520 on the computing device and enable the user to utilize the application subject to the set of permissions maintained by the host application.

In an embodiment, the host application installs the application in a sandbox environment of the computing device. The sandbox environment may enable execution and operation of the application in isolation of other applications and processes of the computing device. For instance, the application may function independently of other applications and processes of the computing device such that there is no interaction between the application and other applications or processes outside of the sandbox environment. The host application may monitor operation of the application within the sandbox environment of the computing device to ensure that the application does not perform any malicious or otherwise harmful actions that may impact performance of the computing device if installed outside of the sandbox environment. The sandbox environment may be implemented in the host application itself. In an embodiment, a sandbox environment is created for each application that is installed by the host application on to the computing device such that each application may be isolated from other applications and processes operating on the computing device. The sandbox environment may be generated after a determination is made as to whether the application is to be installed on to the computing device.

Figure 6:
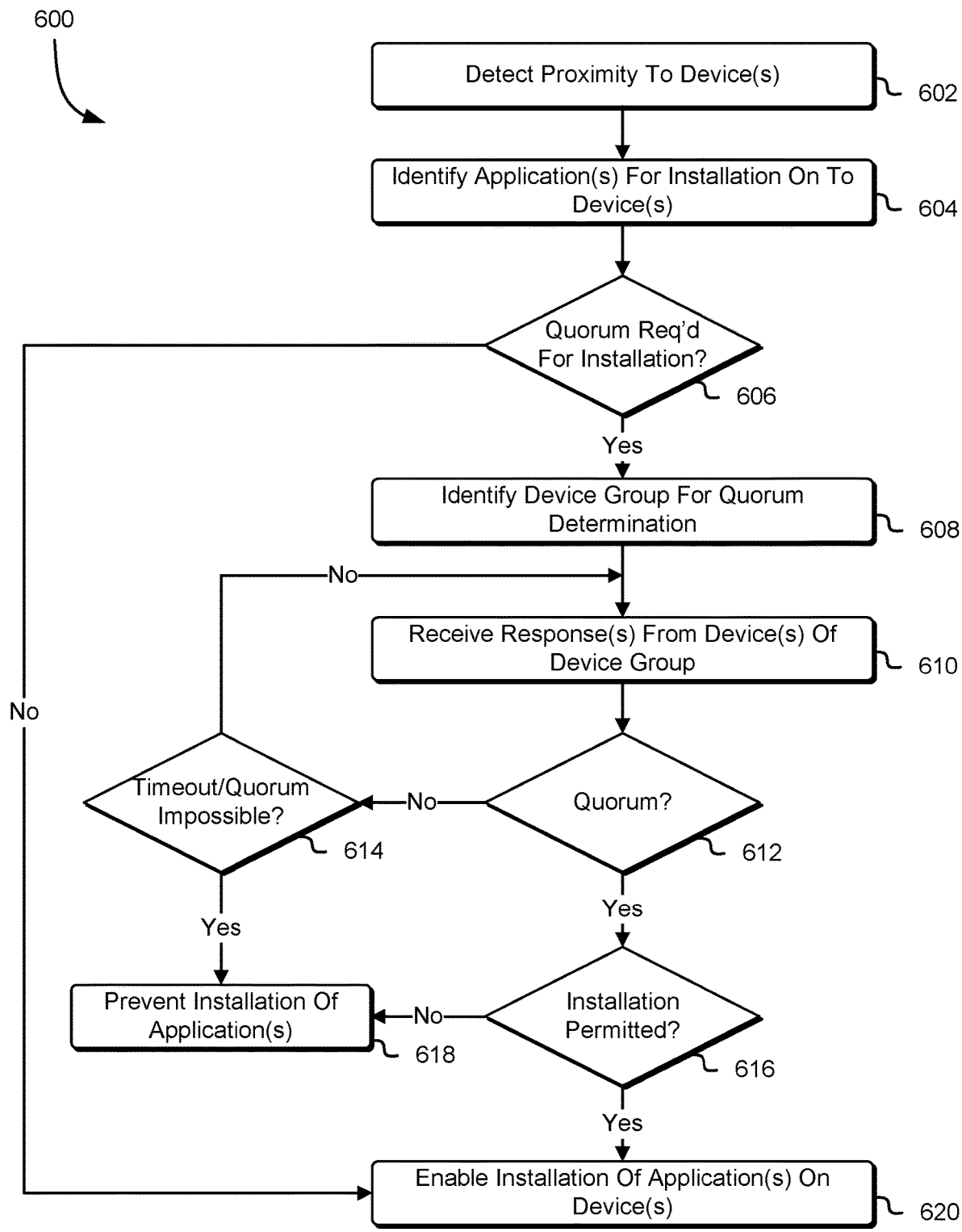
FIG. 6 shows an illustrative example of a process for enabling installation of an application on to computing devices in proximity based on a quorum of computing devices being reached authorizing installation in accordance with at least one embodiment.

As noted above, application data may be provided to host applications of various computing devices dependent on whether a quorum among these various computing devices is reached, whereby the quorum authorizes installation of the application on the computing devices. Accordingly, FIG. 6 shows an illustrative example of a process 600 for enabling installation of an application on to computing devices in geographic proximity based on a quorum of computing devices being reached authorizing installation in accordance with at least one embodiment. The process 600 may be performed by an application vending server or other centralized server that can process authorization responses from computing devices that may be in geographic proximity of an application vending server or other designated location associated with the application vending server.

In an embodiment, an application vending server or other centralized server detects 602 that one or more computing devices are within geographic proximity of the application vending server or other designated location associated with the application vending server. For instance, an application vending server may receive a request from at least one computing device of a group of computing devices to obtain application data usable to install an application on to the computing device. The request may be made by a host application installed on the computing device in response to detection of the computing device being in geographic proximity of the application vending server or of a location associated with the application vending server. Alternatively, the application vending server may obtain location data for the computing device, which the application vending server may utilize to determine a distance between the computing device and the application vending server or other location associated with the application vending server. Based on this calculated distance, the application vending server may detect that a computing device is within geographic proximity of the application vending server or other location associated with the application vending server.

The application vending server may identify 604 which applications are available for installation on to the computing devices in geographic proximity of the application vending server or other location associated with the application vending server. For instance, the application vending server may identify a set of permissions that specify which applications may be installed on to the computing devices. The application vending server may, alternatively, provide a specific application that is available for all computing devices that are in geographic proximity of the application vending server or location associated with the application vending server.

In an embodiment, for particular groups of computing devices, a quorum of computing devices is required to authorize installation of an application on to computing devices of these groups. These quorum requirements may be specified in the set of permissions for installation of the application on to computing devices. For instance, the application vending server may evaluate a set of permissions for the application to determine whether installation of the application on the computing device is subject to group authorization. The set of permissions may associate an identifier of the computing device with an identifier corresponding to the group of computing devices. Further, in an embodiment, the set of permissions specify one or more quorum rules (the satisfaction of which defines a quorum) for determining whether authorization has been provided for installation of the application on to the computing device. In an embodiment, a quorum is reached if the majority of responses from the set of computing devices indicate that either the application may be installed or not. In another embodiment, a quorum is reached if at least a minimum number of computing devices of the group designated as administrators or group leaders of the group indicate that the application may be installed or not. Thus, based on the set of permissions for the application, the application vending server may determine 606 whether a quorum is required for installation of the application on to computing devices of the group.

If a quorum is not required, the application vending server may enable 620 installation of the application on to the computing devices within geographic proximity of the application vending server or location associated with the application vending server. Installation of the application may still be subject to a set of permissions maintained by the host application of each computing device, as described above in connection with the process 500. However, if a quorum is required to determine whether installation of the application is permitted, the application vending server may identify 608 the members of the computing device group for quorum determination. As described above, the set of permissions may associate an identifier of the computing device with an identifier corresponding to the group of computing devices. Thus, the application vending server may use the identifier corresponding to the group of computing devices to identify the other computing devices of the group via a database of computing device groups. This database may associate group identifiers with identifiers of individual computing devices that are members of one or more groups.

The application vending server may transmit a request to each computing device of the group to receive 610 authorization responses from each of these computing devices of the device group. This request, in an embodiment, is transmitted to computing devices of the group that are in geographic proximity of the application vending server or location associated with the application vending server. If the application vending server determines that at least a minimum number of computing devices of the group are present for establishing a quorum, the application vending server may transmit a request to each computing device of the group within geographic proximity of the application vending server or location associated with the application vending server to provide an authorization response for installation of the application on to the computing devices of the group. Users of these computing devices may provide an authorization response, indicating whether the application may be installed on the computing devices.

As the application vending server receives responses from the computing devices of the group, the application vending server may determine 612 whether a quorum has been reached. If the application vending server determines that a quorum has not been reached, the application vending server determines 614 whether a timeout period for receiving additional authorization responses has passed and/or whether it is still possible for a quorum to be reached. If the timeout period has elapsed without a quorum being reached or, based at least in part on the received responses, it is no longer possible to reach a quorum, the application vending server may prevent 618 installation of the application on to the computing devices of the group. However, if the timeout period has not elapsed and a quorum is still reachable, the application vending server awaits additional responses from the remaining computing devices of the group. As new responses are received, the application vending server continues to evaluate these responses to determine 612 whether a quorum has been reached.

If a quorum is reached, the application vending server determines 616, in an embodiment, whether, based at least in part on the received authorization responses, the application can be installed on to the computing devices of the group. In an embodiment, the application vending server prevents 618 installation of the application on the computing devices of the group if the authorization responses of the quorum indicate that the application is not to be installed. However, if the authorization responses indicate that the application may be installed on to the computing devices of the group, the application vending server enables 620 installation of the application on to the computing devices of the group. In an embodiment, the application vending server transmits application data usable to install the application to the computing devices that are in geographic proximity of the application vending server or other location associated with the application vending server. In an embodiment, any computing device whose user provided a negative authorization response can opt out of receiving the application data from the application vending server. This may obviate unnecessary distribution of the application data.

Figure 7:
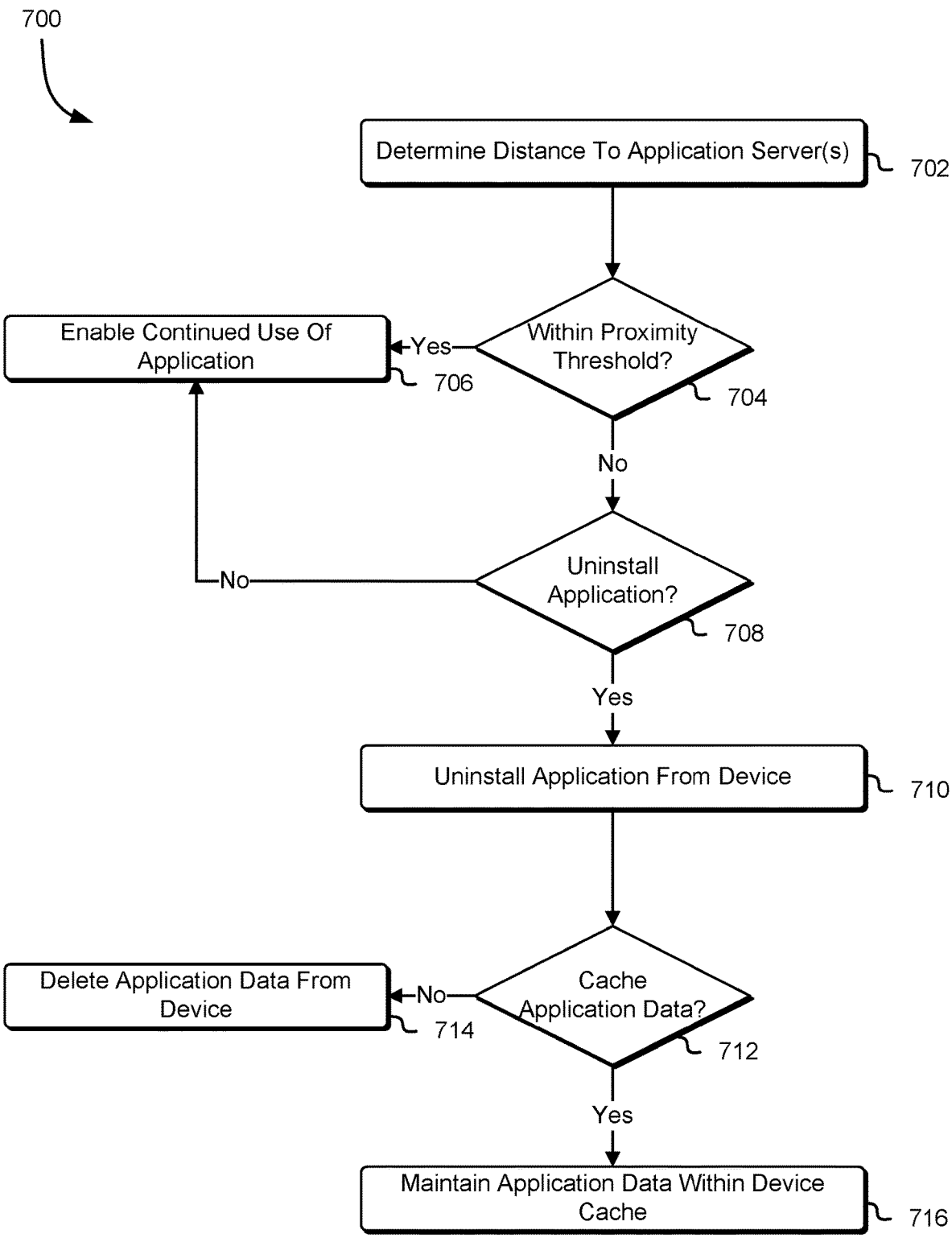
FIG. 7 shows an illustrative example of a process for uninstalling an application from a computing device as a result of the computing device no longer being in proximity to application vending servers in accordance with at least one embodiment.

As noted above, the host application operating on a computing device may continue to monitor the location of the computing device to determine whether the computing device is still within geographic proximity of the one or more application vending servers that provided the application data for the application or of the specific geographic location associated with the one or more application vending servers. If the host application determines that the computing device is no longer in geographic proximity of the one or more application vending servers or of the location associated with the one or more application vending servers, the host application may uninstall the application from the computing device. Accordingly, FIG. 7 shows an illustrative example of a process 700 for uninstalling an application from a computing device as a result of the computing device no longer being in geographic proximity to application vending servers in accordance with at least one embodiment. The process 700 may be performed by the aforementioned host application, which may monitor the location of the computing device and uninstall an application as needed.

In an embodiment, the host application utilizes one or more peripheral devices of the computing device to determine 702 the distance between the computing device and the application vending server or other location associated with the application vending server. For instance, the GPS antenna and GPS receiver of the computing device may be utilized to determine the geographic location of the computing device. Further, the host application may obtain information specifying the location of the application vending server or another location associated with the application vending server on the Earth's surface. Coordinates corresponding to these locations may be used to calculate the distance between the computing device and the application vending server or other location associated with the computing device. As another example, the host application may determine the distance between the computing device and the application vending server based on whether an NFC connection between the computing device and the application vending server or other computing device associated with the application vending server has been terminated or is still active.

Based on the distance between the computing device and the application vending server or other location associated with the application vending server, the host application may determine 704 whether this distance is within a geographic proximity threshold. For instance, for the particular application, there may be a particular geographic proximity threshold that establishes a maximum distance between the computing device and the application vending server or other location associated with the application vending server for defining geographic proximity between the computing device and application vending server/other location. If the host application determines that the distance between the computing device and the application vending server or other location associated with the application vending server is within the geographic proximity threshold, the host application may enable 706 continued use of the application on the computing device.

In an embodiment, if the host application determines that the computing device is no longer in geographic proximity of the application vending server or other location associated with the application vending server, the host application determines 708 whether to uninstall the application from the computing device. For instance, the host application may prompt the user of the computing device to determine whether it would like to maintain the application on the computing device. This enables the user to determine whether it would like to uninstall the application or to keep the application installed on the computing device for later use. If the user opts to maintain the application on the computing device, the host application may enable 706 continued use of the application even while the computing device is not in geographic proximity of the application vending server or other location associated with the application vending server.

If the host application determines that the application is to be uninstalled from the computing device, the host application may uninstall 710 the application and determine 712 whether to maintain application data associated with the application in a cache of the computing device. For instance, the host application may maintain application data in a cache to enable re-installation of the application at a later time should the computing device be in geographic proximity of the application vending server or other location associated with the application vending server. Alternatively, if the application data for the application consumes a significant amount of storage capacity of the computing device, the host application may remove the application data from the computing device. Thus, if the host application determines that the application data for the application is not to be maintained in the cache, the host application may delete 714 the application data from the computing device. However, if the host application determines that the application data is to be maintained in the device cache, the host application may maintain 716 the application data in the device cache. In an embodiment, the application data is maintained in this device cache for a limited amount of time such that if the application is not re-installed within this limited amount of time, the application data is removed from the device cache. Further, if the host application determines that the computing device is in geographic proximity of the application vending server or other location associated with the computing device, the host application may utilize the application data to re-install the application on to the computing device.

Figure 8:
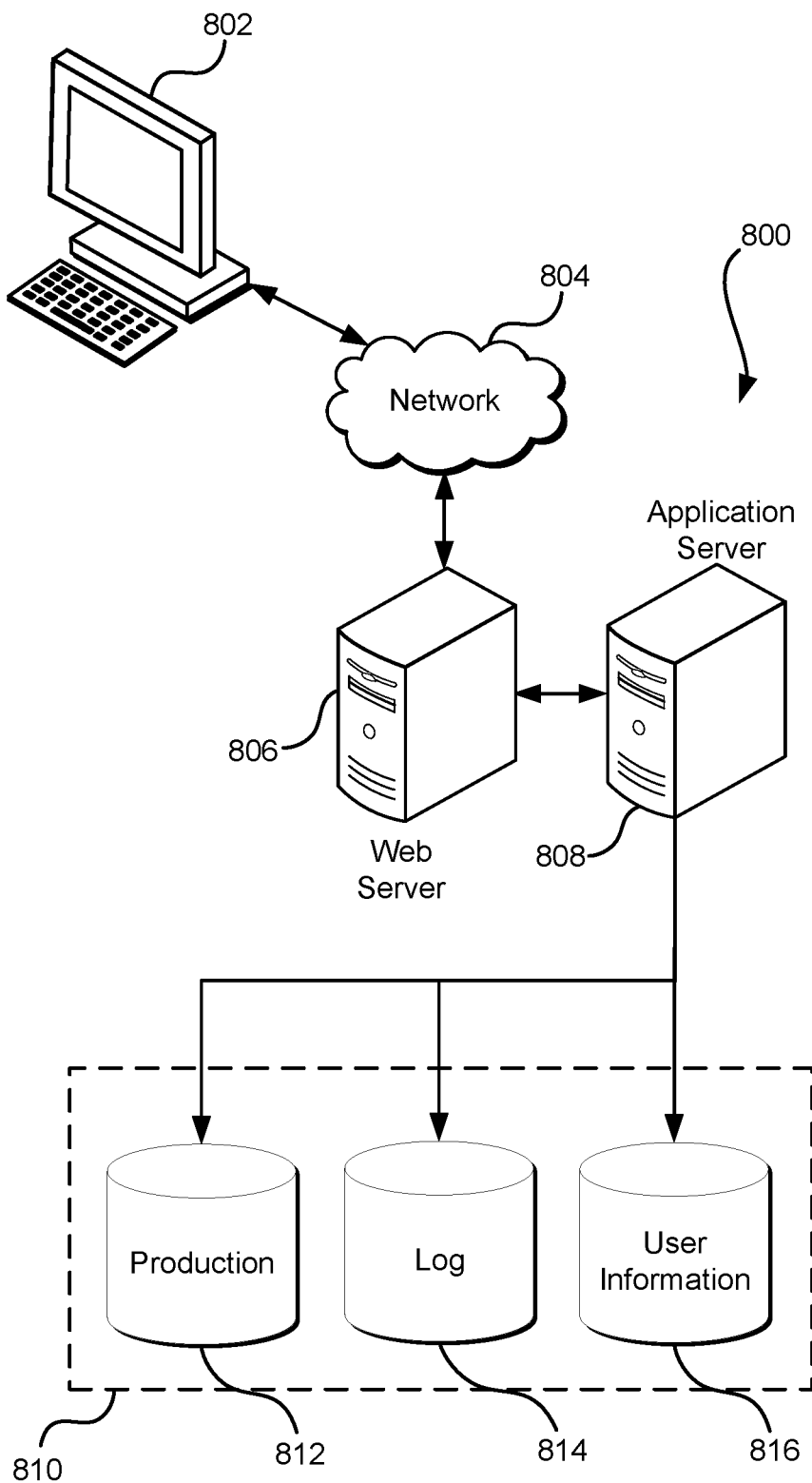
FIG. 8 shows an illustrative example of a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto and the application server 808 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium stores instructions and a main CPU executes some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system that implements an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   detecting proximity of a computing device to an application vending server based on availability of a wireless communication network;
   in response to detecting the proximity of a computing device to the application vending server, determine that approval from a quorum number of computing devices is required for installation of an application;
   obtain, from the quorum number of computing devices, approval to install the application;
   in response to detecting the proximity of the computing device to the application vending server, obtaining, from the application vending server, application code for the application;
   storing the application code in a cache of the computing device; and
   installing, onto the computing device, the application code obtained from the application vending server.

2. The computer-implemented method of claim 1, wherein the application code is installed in a sandbox environment.

3. The computer-implemented method of claim 1, wherein detecting the proximity to the application vending server comprises:
   obtaining a first set of coordinates corresponding to a geographic location of the computing device;
   obtaining a second set of coordinates corresponding to a geographic location of the application vending server;
   determining, based on the first set of coordinates and the second set of coordinates, a distance between the computing device and the application vending server; and
   as a result of the distance being within a proximity threshold, detecting the proximity.

4. The computer-implemented method of claim 1, further comprising:
   detecting the proximity of the computing device to the application vending server;
   obtaining the application code from the cache; and
   re-installing, onto the computing device, the application code.

5. A device, comprising:
   one or more processors; and
   memory that stores computer-executable instructions that cause the one or more processors to:
      detect proximity of the device to a location;
      in response to detection of proximity of the device to the location, connect to a wireless communication network associated with the location;
      obtain, from a plurality of computing devices other than the device, authorization to install an application associated with the location;
      obtain application code for the application associated with the location; and
      install the application code.

6. The device of claim 5, wherein the computer-executable instructions further cause the one or more processors to:
   detect a lack of the proximity of the device to the location; and
   uninstall the application code.

7. The device of claim 6, wherein the computer-executable instructions further cause the one or more processors to store the encrypted application code in a cache of the device to enable re-installation of the application code in response to detecting the proximity of the device to the location.

8. The device of claim 5, wherein:
   the location corresponds to an application vending server that provides the application code; and
   the application code is obtained from the application vending server.

9. The device of claim 5, wherein the computer-executable instructions that cause the one or more processors to detect proximity of the device to the location further cause the one or more processors to:
   obtain a set of coordinates corresponding to a geographic location of the device;
   transmit the set of coordinates to a server that maintains the application code; and
   obtain, from the server, a response that indicates the proximity of the device to the location.

10. The device of claim 5, wherein the computer-executable instructions further cause the one or more processors to:
    identify information usable to enable a set of functions of the application;
    obtain the information; and
    provide the information to the application to enable the set of functions of the application.

11. The device of claim 5, wherein the proximity of the device to the location is detected in response to communications between the device and an application vending server at the location using near-field communication protocols.

12. The device of claim 5, wherein the computer-executable instructions that cause the one or more processors to detect proximity of the device to the location further cause the one or more processors to:
    capture a pictographic representation of the location;
    transmit the pictographic representation to a server that maintains the application code, the server operable to determine the location based on the pictographic representation; and
    obtain, from the server, a response that indicates the proximity of the device to the location.

13. The device of claim 5, wherein the computer-executable instructions further cause the one or more processors to:
    as a result of detection of the proximity of the device to the location a second time, evaluate the encrypted application code to determine availability of an update to the application code;
    reinstall the application code; and
    delete the encryption key.

14. The device of claim 13, wherein evaluating the encrypted application code to determine availability of an update comprises determining whether a version identifier of the encrypted application code corresponds to a current version.

15. A non-transitory computer-readable storage medium having stored thereon executable instructions that, as a result of being executed by one or more processors of a computer system, cause the computer system to at least:
    monitor proximity to a set of locations; and
    as a result of detecting proximity to a location from the set of locations based on detecting a wireless network associated with the location:
       obtain, from a plurality of computing devices, permission to install an application associated with the location;

obtain, from a remote source, application code for the application;

store the application code in a cache of the computer system; and use the application code to install the application.

16. The non-transitory computer-readable storage medium of claim 15, wherein the instructions cause the computer system to:

detect a lack of proximity to the location;

transmit a notification indicating the lack of proximity to the location;

determine, based on a response to the notification, that the application code is to be uninstalled from the computer system; and uninstall the application code.

17. The non-transitory computer-readable storage medium of claim 16, wherein the instructions further cause the computer system to:

detect proximity to the location a second time;

in response to detecting proximity to the location a second time, determine whether the application code corresponds to a current version of the application code available through the remote source; and as a result of the application code corresponding to the current version of the application code, re-install the application using the application code from the cache.

18. The non-transitory computer-readable storage medium of claim 15, wherein the instructions that cause the computer system to use the application code to temporarily install the application further include instructions that cause the computer system to:

transmit the application code to a virtual computing instance accessible by the computer system; and use the application code to temporarily install the application onto the virtual computing instance.

19. The non-transitory computer-readable storage medium of claim 15, wherein the remote source is an application vending server operating at the location.

20. The non-transitory computer-readable storage medium of claim 15, wherein the instructions further cause the computer system to:

obtain data usable to enable a set of functions of the application; and provide the data to the application to enable the set of functions.

21. The non-transitory computer-readable storage medium of claim 15, wherein the instructions further cause the computer system to identify a service set identifier corresponding to a wireless network operating at the location to detect proximity to the location.

22. The non-transitory computer-readable storage medium of claim 15, wherein the instructions further cause the computer system to:

record audio input corresponding to an environment of the computer system;

transmit the audio input to the remote source to enable the remote source to determine, based on the audio input, that the computer system is in proximity to the location; and obtain a response from the remote source indicating proximity to the location.

* * * * *